Patented May 20, 1941

2,242,759

UNITED STATES PATENT OFFICE 2,242,759

REDUCTION OF DIFFICULTLY REDUCIBLE OXIDES

Helmut Schlecht and Michael Jahrstorfer, Ludwigshafen-on-the-Rhine, Germany, assignors, by mesne assignments, to Walter H. Duisberg, New York, N. Y.

No Drawing. Application February 25, 1939, Serial No. 258,572. In Germany March 2, 1938

6 Claims. (Cl. 75—84)

The present invention relates to improvements in the reduction of difficultly reducible oxides.

It has already been proposed to reduce chromium oxide with carbon, and the use of reduced pressure has also been proposed to promote the reaction. The reduction with carbon has the disadvantage that it is only by accurately maintaining the ratio of carbon to chromium oxide necessary for the reaction and by very long periods of reduction to obtain products which are in a satisfactory degree free from carbon and oxide.

By using hydrogen as the reducing agent, it is true that the necessity for accurately maintaining the ratio of the reactants is avoided, but in this case high speeds of flow, and therefore large amounts of hydrogen, must be used in order to remove the water vapor formed from the reaction material. The recovery of the amounts of hydrogen not used from the final gas is troublesome and expensive.

We have now found that the said disadvantages of the known methods can be avoided by carrying out the reduction simultaneously with carbon and with hydrogen and by working under reduced pressure.

By the simultaneous use of the said measures the advantage is obtained that there is no longer any need to maintain accurately the ratio of carbon to chromium oxide because the hydrogen acts on the one hand as an auxiliary reducing agent and on the other hand as a decarbonizing agent. Furthermore use is made in the process of the action of an increased desorption speed of the reaction products by reason of the reduced pressure and also of the action of a carrier gas for carrying away the volatile reaction products, such as water vapor and oxides of carbon, from the reaction chamber. Furthermore the period of reaction is not increased by the use of reduced pressure because the reduction is mainly effected by the carbon. The necessary amounts of hydrogen are only small fractions of the amounts which would be necessary when working under atmospheric pressure, so that a recovery of the hydrogen from the final gas may also be dispensed with.

Instead of or in addition to chromium oxides or hydroxides, there may also be used as initial materials for the process compounds of chromium which are converted into chromium oxides under the working condtions, in particular compounds of chromium with inorganic or organic acids. The various initial materials may be used also in admixture with metals or alloys. The carbon may be used in various forms, as for example as wood carbon, graphite, carbon black or lignite small coke. Generally speaking the amount of carbon required is less the slower it reacts with hydrogen. The choice of the kind of carbon is naturally determined by the desired degree of purity of the final product. Instead of or in addition to carbon, use may also be made of substances containing carbon or forming carbon under the reaction conditions, as for example metals or alloys rich in carbon, preferably in powder form, or also sugar or wool meal.

Suitable reaction temperatures are between 900° and 1300° centigrade. The addition of certain metals to the reaction material renders possible in many cases a lowering of the temperature, as for example by from about 100° to 200° centigrade. These metals are preferably used in a finely divided form, as for example in that finely powdered form in which many metals, as for example those of the iron group, are obtainable by decomposition of their carbonyl compounds. A facilitation of the reduction may also be obtained by incorporating oxides of readily reducible metals, as for example of the iron group, with difficultly reducible chromium compounds. It is often advisable to make the mixture into a paste with a liquid, for example water or an organic liquid, to dry the paste thus formed and, if desired to grind and to sieve the dry material and then to mould the finer portion by a pressure treatment before subjecting it to the reduction.

The usual technical means are sufficient for the production of the reduced pressure; working may well be carried on with absolute pressures of about 50 millimeters (mercury gauge). The hydrogen is preferably led over the mixture at comparatively high speed of flow, say from 5 to 100, in particular from 5 to 30 liters (calculated at normal conditions) per hour per liter of space in the reaction chamber. With a given amount of hydrogen, a better effect per unit of time is obtained the lower the pressure is. It is preferable to use the hydrogen in the purest possible state, in particular free from oxygen and water vapor. Such impurities need not be completely excluded, however; for example industrial hydrogen may be used without special preliminary purification, especially when importance is not attached to complete freedom from carbon and oxygen in the metal to be prepared.

The chromium metal or chromium alloys obtainable according to this invention are distinguished by a high purity. Although chromium has a strong tendency to form carbide, it is possible to prepare directly chromium practically free from carbon even when an excess of carbon is used.

The reaction product usually constitutes a porous mass lightly sintered together. If it cannot be exploited in this form, it may usually be triturated without difficulty to a fine metal powder or also worked up into shaped articles by a pressure treatment.

The process according to this invention is also suitable for the reduction of other difficultly reducible oxides of elements of the 2nd to the 7th group of the periodic system. It is especially suitable for the preparation of beryllium, aluminum, silicon, titanium, thorium, vanadium, niobium, tantalum, molybdenum, tungsten, uranium and manganese. The process is generally carried out at temperatures between 800° and 1600° centigrade. In some cases it is preferable to increase the temperature continuously or in stages during the treatment.

The said elements may be prepared according to this invention in a very pure state, in particular free to a great extent from carbon and oxygen, and also free from foreign metals, which are unavoidable for example in the usual alumino-thermic method of preparation.

It has already been proposed to reduce beryllium oxide in a metal bath with carbon while using a vacuum. Furthermore, beryllium oxide and tantalic acid have already been reduced with carbon and hydrogen at atmospheric pressure. Contrasted with these methods of working, however, the process according to this invention offers the advantage that by using the carbon and hydrogen under reduced pressure, the speed of the reaction is considerably increased. Working with hydrogen under reduced pressure, as contrasted with working at atmospheric pressure, is attended by the advantage of a considerable saving in hydrogen.

The following examples will further illustrate how the present invention can be carried out in practice but the invention is not restricted to these examples. The parts are by weight.

Example 1

138 parts of chromium oxide are intimately mixed with 34 parts of carbon black obtained from naphthalene. After the coarser portions have been sieved off by a sieve having 400 meshes per square centimeter, the mixture is heated at 1200° centigrade for 8 hours under a pressure of 20 millimeters (mercury gauge) in a current of hydrogen flowing at a speed of 15 liters per hour per liter of reaction space. The lightly sintered metal mass thus obtained may readily be passed through a sieve having 10,000 meshes per square centimeter after grinding. The powder consists to the extent of 99.5 per cent of chromium and it contains less than 0.01 per cent of carbon.

Example 2

76 parts of chromium oxide are intimately mixed with 135 parts of a chromium metal containing 14.6 per cent of carbon in the form of carbide by grinding in a ball mill. The mixture is heated at 1200° centigrade for 10 hours under a pressure of 30 millimeters (mercury gauge) in purified hydrogen at a speed of flow of 20 liters per hour per liter of reaction space. A sintered piece of metallic chromium of the same purity as the product of Example 1 is obtained.

Example 3

A fine powder mixture of 152 parts of chromium oxide, 33 parts of carbon black obtained from naphthalene and 416 parts of nickel powder obtained by thermal decomposition of nickel carbonyl is heated for 15 hours at 1000° centigrade under a pressure of 40 millimeters (mercury gauge) in purified hydrogen at a speed of flow of 30 liters per hour per liter of reaction space. The porous chromium-nickel sintered piece, containing 0.03 per cent of carbon thus obtained may be worked into a compact material by hammering or rolling.

Example 4

200 parts of vanadium trioxide and 50 parts of naphthalene carbon are intimately mixed, made into a paste with water and kneaded. The mixture is brought into the form of briquettes, dried and then exposed at 1500° centigrade under a pressure of 60 millimeters (mercury gauge) in a high-frequency furnace to a current of purified hydrogen, which flows through the furnace at a speed of 10 liters per hour per liter of furnace space, for three hours. A porous sinter piece of pure metallic vanadium is obtained which may be readily powdered.

Example 5

450 parts of tantalic acid are intimately mixed with 66 parts of naphthalene carbon and exposed in a high-frequency furnace for 3 hours to a current of hydrogen at a speed of 20 liters per hour per liter of furnace space under a pressure of 50 millimeters (mercury gauge) at 1500° centigrade. A sinter piece of metallic tantalum is obtained which is practically free from impurities.

Example 6

45 parts of uranium dioxide, prepared from the uranoso-uranic oxide by reduction with hydrogen at red heat, are mixed with 4 parts of naphthalene carbon and 357 parts of nickel powder obtained by decomposition of nickel carbonyl and beaten through a 400-mesh sieve. The powder mixture is heated for 12 hours in a current of purified hydrogen at a speed of 50 liters per hour per liter of furnace space under a pressure of 30 millimeters (mercury gauge) at 1200° centigrade. A porous sinter piece is obtained consisting of a uranium-nickel alloy containing 10 per cent of uranium.

Example 7

45 parts of uranium dioxide are mixed with 6 parts of beech wood carbon and 476 parts of molybdenum oxide (MoO$_2$) and heated to 1300° centigrade for 10 hours in a current of purified hydrogen at a speed of 50 liters per hour per liter of furnace space under a pressure of 20 millimeters (mercury gauge). The sinter piece thus obtained consists of an alloy of 10 per cent of uranium and 90 per cent of molybdenum.

Example 8

A mixture of 10 parts of beryllium oxide, 68 parts of copper powder and 5 parts of naphthalene carbon is heated to 1500° centigrade for 4 hours in a high-frequency furnace in a current of purified hydrogen at a speed of 50 liters per hour per liter of furnace space under a pressure of 10 millimeters (mercury gauge). An alloy of beryllium and copper containing about 5 per cent of beryllium is obtained.

Example 9

A mixture of 12 parts of niobic acid, 16 parts of carbon black and 200 parts of carbonyl iron powder is first heated to 1130° centigrade for 12 hours and then to 1220° centigrade for one hour in a current of purified hydrogen at a speed of 50 liters per hour per liter of furnace space under a pressure of 20 mm. (mercury gauge). A sintered alloy of niobium and iron containing 20% of niobium and 0.03% of carbon is obtained.

Example 10

60 parts of silicic acid, 24 parts of naphthalene carbon black and 532 parts of carbonyl nickel powder are intimately mixed and the mixture is shaped by a hydraulic pressure treatment to form a four-edged bar. The pressed bar is heated to 1200° centigrade for 20 hours in a current of purified hydrogen at a speed of 100 liters per hour per liter of furnace space under a pressure of 40 mm. (mercury gauge). The sintered bar thus obtained consists of an alloy of silicon and nickel containing 5% of silicon. It can be forged at red heat to form a compact bar.

Example 11

80 parts of titanium dioxide, 24 parts of carbon black and 432 parts of carbonyl nickel powder are intimately mixed. After sieving off the coarser particles the mixture is heated to 1200° centigrade for 20 hours in a current of hydrogen at a speed of 50 liters per hour per liter of furnace space under a pressure of 20 mm. (mercury gauge). A sintered alloy of titanium and nickel is obtained which contains 10% of titanium and is practically free from carbon.

Example 12

102 parts of aluminum oxide, 36 parts of carbon black and 486 parts of carbonyl nickel powder are mixed and kneaded with water to form a paste. After drying, the solid mixture is triturated, sieved and shaped by a pressure treatment to form a four-edged bar. The pressed bar is heated to 1200° centigrade for 20 hours in a current of purified hydrogen at a speed of 50 liters per hour per liter of furnace space under a pressure of 20 mm. (mercury gauge). The porous sintered bar thus obtained consists of about 10% of aluminum and 90% of nickel and contains 0.05% of carbon.

What we claim is:

1. A process for the reduction of difficultly reducible oxides of elements selected from the group consisting of chromium, beryllium, aluminum, silicon, titanium, thorium, vanadium, niobium, tantalum, molybdenum, tungsten, uranium and manganese, which comprises intimately admixing said oxides with carbon and subjecting the mixture in the solid state to a heat-treatment at a temperature of from about 800 to 1600° C. with elementary hydrogen while working under reduced pressure and maintaining the solid state of said oxides during the heat treatment while selecting a temperature below the point at which the metal of the selected oxide distills.

2. A process for the reduction of difficultly reducible oxides of elements selected from the group consisting of chromium, beryllium, aluminum, silicon, titanium, thorium, vanadium, niobium, tantalum, molybdenum, tungsten, uranium and manganese, which comprises intimately admixing said oxides with carbon and subjecting the mixture in the solid state to a heat-treatment at a temperature of from about 800 to 1600° C. with a current of elementary hydrogen under reduced pressure while maintaining the solid state of said oxides during the heat treatment and while selecting a temperature below the point at which the metal of the selected oxide distills.

3. A process for the reduction of difficultly reducible oxides of elements selected from the group consisting of chromium, beryllium, aluminum, silicon, titanium, thorium, vanadium, niobium, tantalum, molybdenum, tungsten, uranium and manganese, which comprises intimately admixing said oxides with carbon and subjecting the mixture in the solid state to a heat-treatment at a temperature of from about 800 to 1600° C. with a current of 5 to 100 liters of elementary hydrogen per hour per liter of the reaction chamber while maintaining reduced pressure in the said chamber and maintaining the solid state of said oxides during the heat treatment while selecting a temperature below the point at which the metal of the selected oxide distills.

4. A process for the reduction of difficultly reducible oxides of elements selected from the group consisting of chromium, beryllium, aluminum, silicon, titanium, thorium, vanadium, niobium, tantalum, molybdenum, tungsten, uranium and manganese, which comprises intimately admixing said oxides with carbon and subjecting the mixture in the solid state to a heat-treatment at a temperature of from about 800 to 1600° C. with a current of 5 to 100 liters of elementary hydrogen per hour per liter of the reaction chamber while maintaining a pressure not exceeding about 50 mm. (mercury gauge) in the said chamber and maintaining the solid state of said oxides during the heat treatment while selecting a temperature below the point at which the metal of the selected oxide distills.

5. In the process as claimed in claim 1 employing the carbon in the form of carbon-containing metallic additional substances.

6. In the process as claimed in claim 1 working in the presence of readily reducible metal oxides.

HELMUT SCHLECHT.
MICHAEL JAHRSTORFER.